US006660551B1

(12) United States Patent
Pabla

(10) Patent No.: US 6,660,551 B1
(45) Date of Patent: Dec. 9, 2003

(54) SEMICONDUCTOR PROCESS

(75) Inventor: Arbinder S Pabla, Colchester (GB)

(73) Assignee: British Telecommunications, London (GB)

( * ) Notice: Subject to any disclaimer, the term of this patent is extended or adjusted under 35 U.S.C. 154(b) by 0 days.

(21) Appl. No.: 10/088,542

(22) PCT Filed: Oct. 3, 2000

(86) PCT No.: PCT/GB00/03788

§ 371 (c)(1),
(2), (4) Date: Mar. 19, 2002

(87) PCT Pub. No.: WO01/29592

PCT Pub. Date: Apr. 26, 2001

(30) Foreign Application Priority Data

Oct. 19, 1999 (EP) .............................................. 99308245

(51) Int. Cl.[7] .............................................. H01L 21/20
(52) U.S. Cl. .......................... 438/39; 438/41; 438/479; 438/46
(58) Field of Search ............................ 438/22, 24, 46, 438/47, 39, 40, 41, 42, 43, 44, 478, 479, 483; 117/84, 95

(56) References Cited

U.S. PATENT DOCUMENTS

| | | | |
|---|---|---|---|
| 5,784,400 A | * | 7/1998 | Joannopoulos et al. |
| 5,998,298 A | * | 12/1999 | Fleming et al. |
| 5,999,308 A | * | 12/1999 | Nelson et al. |
| 6,026,110 A | * | 2/2000 | Makino |
| 6,130,780 A | * | 10/2000 | Joannopoulos et al. |
| 6,358,854 B1 | * | 3/2002 | Fleming et al. |
| 6,468,348 B1 | * | 10/2002 | Gruning et al. ................ 117/94 |
| 6,521,136 B1 | * | 2/2003 | Sfez et al. ..................... 216/24 |
| 2003/0013274 A1 | * | 1/2003 | Noda .......................... 438/455 |

OTHER PUBLICATIONS

Sozuer et al, "Photnic Band Caluculations for Woodpile structure", Journal of Modern Optics, 1994, vol. 41 No. 2 pp 231–239.*
Cheng et al, "Fabrication of Photonic Band–Gap Crystals", J. Vac. Sci. Technol. B, 13(6), p. 2696, 1995.
Cheng et al, "Lithographic Band Gap Tuning in Photonic Band Gap Crystals", J. Vac. Sci. Technol. B, 14(6), p. 4110, 1996.
Shawn–Yu, et al, Photonic Band–Gap Microcavities in Three –Dimensions, Physical Review B, vol. 59, No. 24, p. 15579, 1999.
Kosaka et al, "Photonic Crystals for Micro Lightwave Circuits Using Wavelength–Dependent Angular Beam Steering", Applied Physics Letters, vol. 74, No. 10, p. 1370, 1999.
Noda et al, "Optical Proprieties of Three–Dimensional Photonic Crystals Based on III–V Semiconductors at Infrared to Near–Infrared Wavelengths", Applied Physics Letters, vol. 75, No. 7, p. 905, 1999.
Scherer et al, "Microfabrication of Photonic Bandgap Crystals", California Institute of Technology, p. 3063, circa 1996.

* cited by examiner

Primary Examiner—Savitri Mulpuri
(74) Attorney, Agent, or Firm—Nixon & Vanderhye, PC

(57) ABSTRACT

A process by which photonic band gap structures are created by etching trenches in indium gallium arsenide, preferentially infilling the trenches with indium phosphide and forming multiple layers of interleaved regions of indium gallium arsenide and indium phosphide.

8 Claims, 3 Drawing Sheets

SEMICONDUCTOR PROCESS

This application is the U.S. national phase of international application PCT/GB00/03788 filed Oct. 3, 2000 which designated the U.S.

FIELD OF THE INVENTION

This invention relates to a method of processing semiconductor materials in order to create photonic band gap materials.

Semiconductor materials have an electrical band gap, which exists between the conduction band and the valence band, which electrons may not occupy due to an absence of energy levels. In a similar manner, there are some materials that exhibit a photonic band gap in which light of a given wavelength may not propagate. Such photonic band gap materials have great potential for use in constraining and trapping light for example in waveguides, optical memory, cavities of light emitting devices etc.

BACKGROUND OF THE INVENTION

A number of methods of making photonic band gap crystals have been proposed; Lin et al, "A three-dimensional photonic crystal operating at infrared wavelengths", Nature, vol. 394, Jul. 16, 1998, pp 251–253, report a 'woodpile' crystal of polycrystalline silicon rods which was fabricated by depositing a layer of silica, masking the silica in a desired pattern, etching the unmasked silica and filling the trenches with polycrystalline silicon. The surface of the wafer was then made flat using chemical mechanical polishing and the process was repeated, with successive layers of polycrystalline silicon rods being formed in alternating orthogonal orientations. Once a sufficient number of layers had been deposited, the $SiO_2$ was removed in an $HF/H_2O$ solution. The polycrystalline silicon rods had a thickness of 1.6 $\mu$m, a width of 1.2 $\mu$m and the spacing between rods was 4.2 $\mu$m. The photonic band gap crystal had a stop band of 10–14.5 $\mu$m with an attenuation of approximately 12 dB per cell.

Alternative techniques used to fabricate photonic band gap materials include the use of two photon excitation resins (Cumpston et al, "Two-photon polymerisation initiators for three-dimensional optical data storage and microfabrication", Nature, volume 398, Mar. 4, 1999, pp 51–54) and radio frequency bias sputtering of $Si/SiO_2$ (Hanaizumi et al, "Propagation of light beams along line defects formed in a $Si/SiO_2$ three-dimensional photonic crystals: Fabrication and observation", Applied Physics Letters, volume 74, number 6, Feb. 8, 1999, pp. 777–779). For a more general description of photonic band gap materials and crystals see J D Joannopoulos, R D Meade, J N Winn, "*Photonic crystals: Molding the Flow of Light*", Princeton University Press, ISBN 0-691-037447-2.

The disadvantage with these known techniques is that they are not compatible with fabrication techniques for opto-electronic devices, which will reduce the level of integration that will be possible. Additionally, techniques which rely on mechanical steps, such as polishing, will have problems when attempting to fabricate crystals which require physical dimensions having a very small resolution, for example sub-micron resolution.

SUMMARY OF THE INVENTION

According to a First aspect of the present invention there is provided a method of making a photonic band gap material, the method comprising the steps of;

(a) growing an epitaxial layer of a first semiconductor material onto a substrate;

(b) applying a mask to selected areas of the first semiconductor material and etching away the non-masked areas of the first semiconductor material to form a plurality of recesses;

(c) selectively growing an epitaxial layer of a second semiconductor material to fill the plurality of recesses created by the etching of the first semiconductor material; characterised in that the method comprises the further steps of;

(d) growing a further epitaxial layer of the first semiconductor material over the first semiconductor material and the second semiconductor material;

(e) applying a mask to selected areas of the further epitaxial layer of the first semiconductor material and etching away the non-masked areas of the further epitaxial layer of the first semiconductor material to form a further plurality of recesses, said further plurality of recesses being rotationally displaced with regard to the plurality of recesses formed within the preceding layer of the first semiconductor material;

(f) selectively growing a further plurality of epitaxial layers of the second semiconductor material to fill the recesses created by the etching of the first semiconductor material; and (g) repeating steps (d), (e), and (f) as required to form a semiconductor product having a plurality of layers of interleaved regions of the first semiconductor material and the second semiconductor material, the regions in each of the layers being rotationally displaced with regard to the regions in the adjacent layers.

The advantage of this method is that the deposition and etching processes allow for very accurate control of the recesses and layers, giving significantly increased control over the dimensions of the structure. This enables semiconductor structures having a higher quality to be made. The deposition and etching processes are the same as those used in the fabrication of other semiconductor devices, enabling structures made according to the above to be readily integrated with other semiconductor devices.

Preferably the method is further characterised by the etching of the semiconductor product to selectively remove substantially all of the first semiconductor material whilst leaving the second semiconductor material substantially unaffected. Alternatively, the method is further characterised by the etching of the semiconductor product to selectively remove substantially all of the second semiconductor material whilst leaving the first semiconductor material substantially unaffected. The advantage of this is the increased difference in permittivity which is gained by removing one of the semiconductor materials will enhance the properties of the semiconductor product. The adjacent layers of semiconductor materials may be rotationally displaced by substantially 90°.

Preferably the first semiconductor material is indium gallium arsenide and the second semiconductor material is preferably indium phosphide. This enables the semiconductor structure to be made using well known semiconductor fabrication processes. Additionally, this has the advantage that the semiconductor structure can function in one of the telecommunications wavelength windows and that such structures can be integrated within opto-electronic components that operate within one of the telecommunications wavelength windows.

Preferably the indium phosphide is selectively grown in the presence of a chloride compound which gives the advantageous deposition of the indium phosphide is selectively grown in the presence of phosphorus trichloride ($PCl_3$)

According to a second aspect of the present invention there is provided a photonic band gap material fabricated using a method as described above.

According to a third aspect of the present invention there is provided an opto-electronic device comprising a photonic band gap material fabricated as described above.

BRIEF DESCRIPTION OF THE DRAWINGS

The invention will now be described, by way of example only, with reference to the following figures in which.

DETAILED DESCRIPTION OF THE INVENTION

Figure 1A:
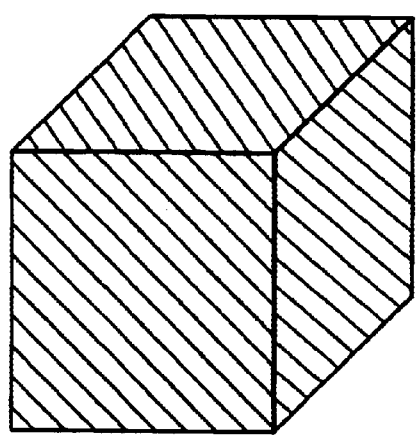
FIG. 1 shows a schematic depiction of a number of different photonic crystal structures.
Figure 1B:
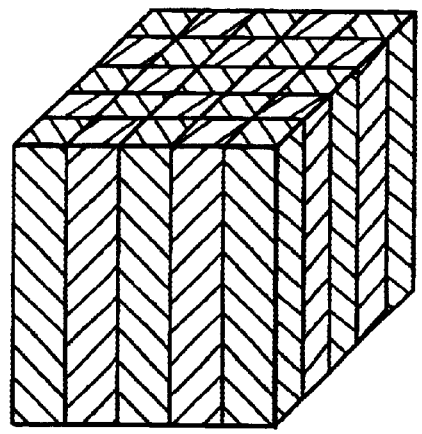
Figure 1C:
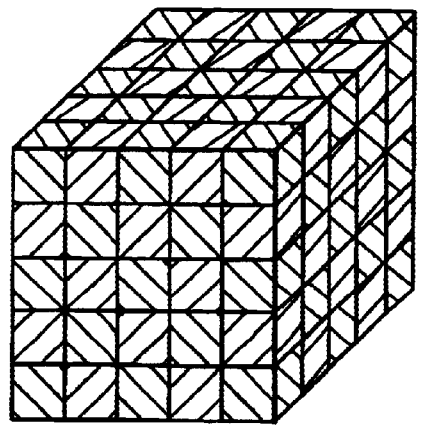

FIG. 1 shows a number of different photonic crystal structures. FIG. 1a shows a one-dimensional photonic crystal, FIG. 1b shows a two-dimensional photonic crystal and FIG. 1c shows a three-dimensional photonic crystal. All of these photonic band gap crystals are formed from two different materials, with the properties of those materials and the geometry of the crystals affecting the properties of the photonic crystals. The efficiency of a photonic crystal, i.e. the volume of crystal required to provide a given photonic effect, is dependent upon the difference in permitivity between the two materials which form the crystal and thus the greatest efficiency is obtained when one of the materials is not present, i.e. the crystal is formed from one material. Three-dimensional photonic crystal structures which are of great interest and which are referred to as 'woodpile' structures consist of rods of a crystal material arranged in successively orthogonal layers.

Although the strict definition of a photonic band gap material is one in which certain wavelengths may not propagate it is to be understood that in the following discussion reference to photonic band gap materials and crystals also includes those materials and crystals which exhibit some degree, or substantially all, of the properties associated with photonic band gap materials and crystals.

FIG. 2 shows the process of the present invention being used to fabricate a 'woodpile' three-dimensional photonic crystal. A number of epitaxial layers of indium gallium arsenide (InGaAs) 20 are grown to a desired thickness (see FIG. 2a), for example 1 $\mu$m, on an indium phosphide (InP) substrate 10 in a MOVPE (Metallorganic Vapour Phase Epitaxy) reactor. The InGaAs may be grown at a temperature of 660 C with a reactor pressure of 810.3 torr. The Group III compounds used are trimethylindium (which is stored at 35.23C) and trimethylgallium (which is stored at −12.03C). The group V compound is arsine (AsH$_3$) which is supplied in a 5%:95% arsine/hydrogen mix. A 0.2 $\mu$m thick silicon dioxide (SiO$_2$) layer 30 is then deposited upon the InGaAs surface. This layer is then covered with a photoresist 40, for example Shipley Microposit S1805 which is applied by spinning at approximately 5000 rpm. The surface is then exposed to a u-v source through a chrome mask having the form of a number of parallel stripes each, in this exemplary case, being 1 $\mu$m wide and having a spacing of 1 $\mu$m between each adjacent stripe. The u-v exposed photoresist is then removed using a developer, for example Shipley Developer MF 319 and any further excess photoresist is then removed by exposure to oxygen plasma for approximately 45 minutes at 500W.

The SiO$_2$ surfaces which have been exposed by the removal of the photoresist are then etched, preferably using a 50:50 mix of trifluoromethane (CHF$_3$) and hexafluroroethene (C$_2$F$_6$) at a pressure of 160 mTorr, a temperature of 14° C. and a power of 175W. The etch is applied three times for a period of 5 minutes each. It has been found that exposure for periods longer than 5 minutes can cause the photoresist to breakdown. An etching process is then performed in a known manner to remove the InGaAs material not covered by the striped SiO$_2$ layer, thus forming a plurality of parallel trenches 50 (see FIG. 2b) located between the regions of the silicon dioxide. The etching process is controlled so that the InGaAs material is removed down to the InP substrate, i.e. in this case, forming a trench having a square cross-section with a dimension of 1 $\mu$m. A preferred etching process is a dry etch in a mixture of hydrogen and methane, with a power of 200W, a DC bias voltage of approximately 470V, a pressure of 70 mTorr and at a temperature of approximately 13° C.

Figure 2A:
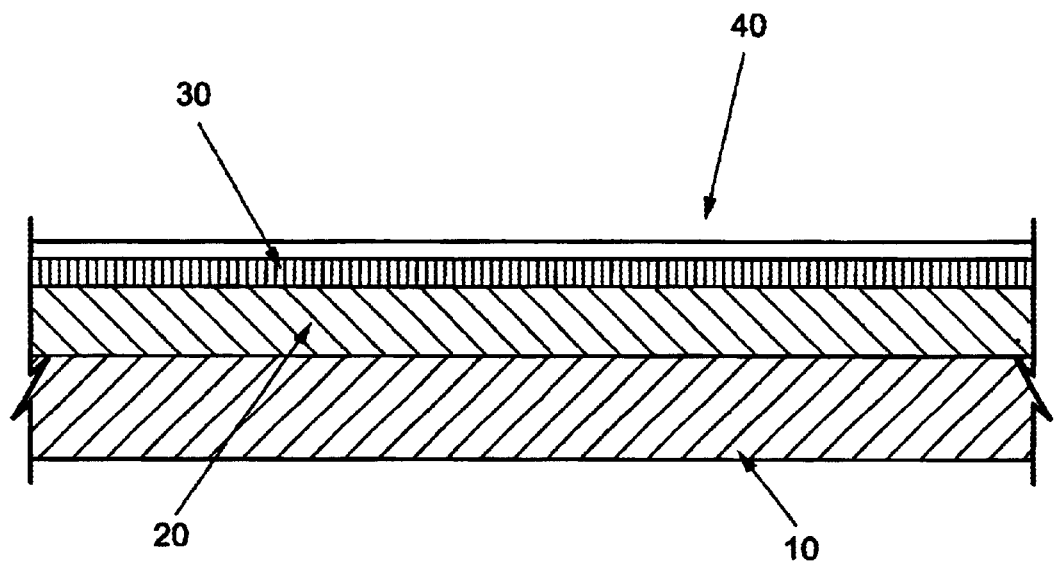
FIG. 2 shows a schematic depiction of a process according to the present invention.
Figure 2B:
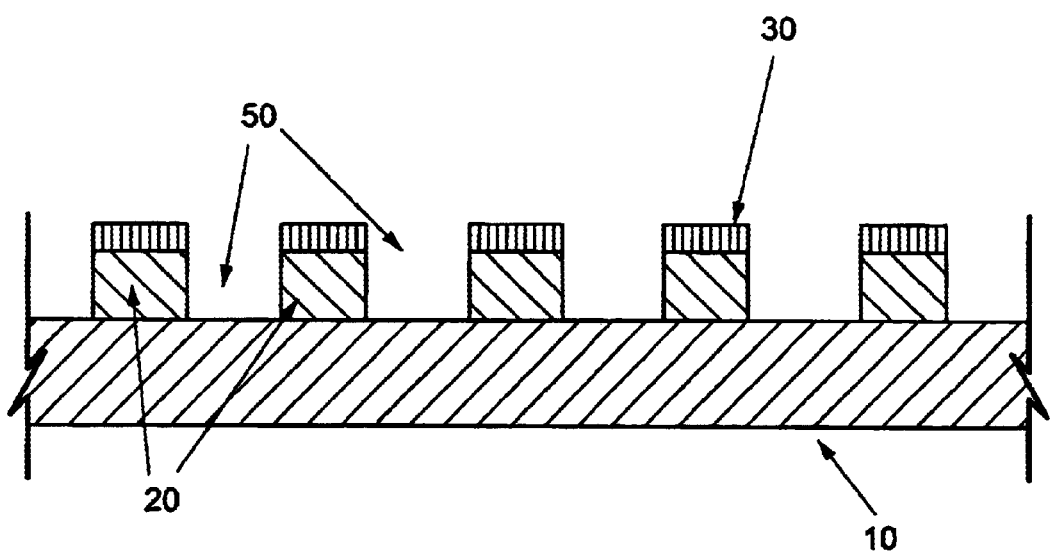
Figure 2C:
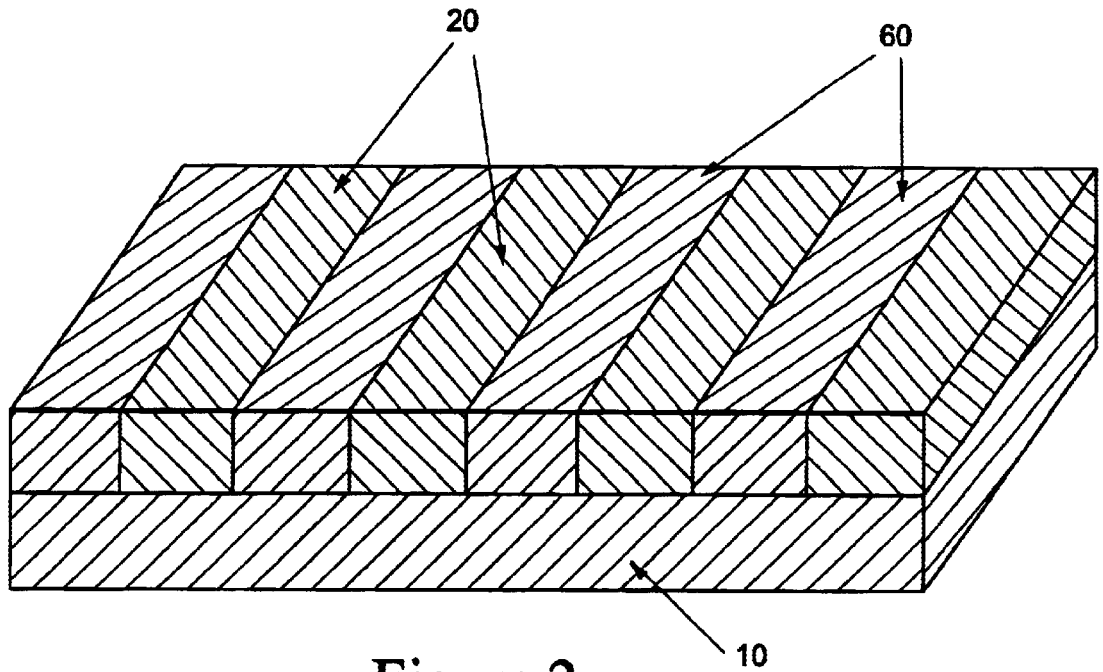

Indium phosphide (InP) is then grown in the presence of phosphorus trichloride (PCl$_3$), in a known manner (see M J Harlow et al, "The influence of PCl$_3$ on planarisation and selectivity of InP regrowth by atmospheric MOVPE", 7th International Conference on Indium Phosphide and Related Materials, Sapporo, Japan pp 329–332 & SD Perrin et al "Planarised InP regrowths around tall and narrow mesas using chloride-MOVPE" 11th International Conference on Indium Phosphide and Related Materials, Davos, Switzerland, pp 63–66), which causes linearised planar growth of InP within the trenches formed by the etching of the InGaAs material. As described by Harlow et al op cit, the InP is selectively grown only within the trenches, and not upon the SiO$_2$ masked-InGaAs mesas which define the trenches. The InP/PCl$_3$ growth process continues until the trenches are completely filled with InP. Following the growth of InP into the trenches, the SiO$_2$ mask is removed by wet etching with hydrofluoric acid (HF) for 2 minutes. FIG. 2c shows a perspective view of an InP substrate 10 and alternating regions of InP 60 and InGaAs 20.

Subsequently, a further plurality of epitaxial layers of InGaAs material are grown over the entire surface area of the composite InGaAs/InP material. The InGaAs is deposited using the conditions described above, except that the temperature is ramped up to 660° C. in an atmosphere of phosphine (PH$_3$) to prevent desorption of the phosphorous. A layer of silica is deposited over the InGaAs, followed by a layer of photoresist both as described above. For the second, and subsequent, resist layers a thicker layer is required (as is known), for example Shipley Microposit S1813 which is also spun on at approximately 5000 rpm. The photoresist is exposed to a u-v source through a chrome mask identical to the one described above, but at an orientation of 90° to that of the first mask. The u-v exposed photoresist is then removed using a developer and any further excess photoresist is then removed by exposure to oxygen plasma, as described above. The exposed SiO2 regions are then etched using the CHF$_3$/C$_2$F$_6$ mixture described above and then the InGaAs is etched, creating a plurality of trenches that are orthogonal to the trenches now filled with InP.

Figure 2D:
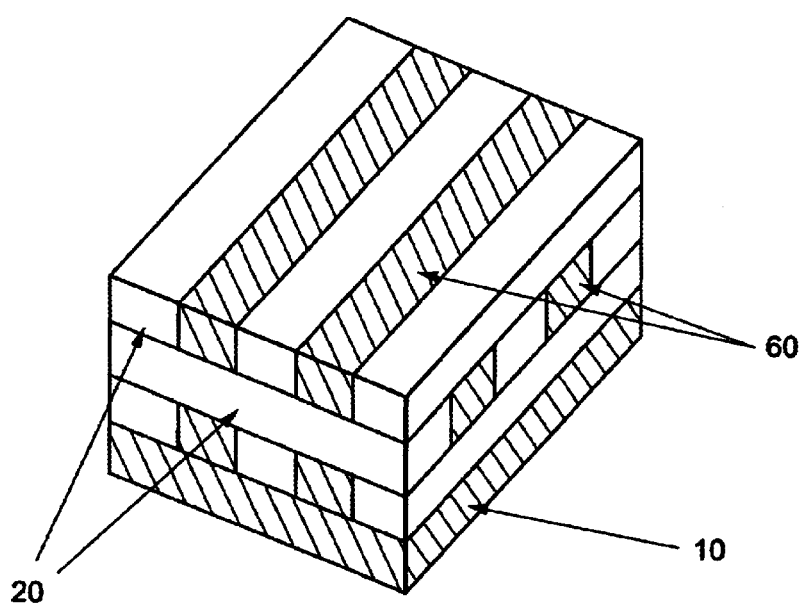

Again, the etching process is controlled to produce trenches of a desired depth and so that the InGaAs material in the layer below the masked layer is not effected. A further InP/PCl$_3$ growth process (as described above) is performed in order to fill these trenches with planar InP. The SiO$_2$ mask regions are then stripped off the InGaAs regions of the uppermost layer. The processes of depositing InGaAs, SiO$_2$ and photoresist and subsequently etching to form trenches and then selectively growing InP to fill the trenches are repeated until a desired number of layers have been formed of the composite InGaAs/InP structure. FIG. 2d shows a structure having an InP base substrate 10 and three layers of alternating regions of InGaAs 20 and InP 60.

Once sufficient layers have been formed, say, for example, eight layers, the structure will exhibit photonic band gap material properties, but these properties will be enhanced by removing one of the materials from the structure as this increases the difference in permitivity between the two materials of the structure. This can be achieved by the removal of either the InGaAs or the InP using a suitable etchant or solvent. As the structure has been deposited upon an InP substrate it is preferred to remove the InGaAs. The InGaAs is preferably removed by applying 70% concentrated nitric acid ($HNO_3$) to the structure for 2 hours. If the InP is to be removed, it may be preferred to deposit a buffer layer over the InP substrate, or alternatively to use a different substrate material.

Although the above process has described the use of ultra-violet lithography with a chrome mask, it should be understood that this is only one possible method of patterning the silicon dioxide layer and that other methods which allow similar patterns to be formed on the silicon dioxide layer are equally suitable for use with the present invention. If greater dimensional resolution is required, for example sub-micron resolution, then a direct write lithography process should be used, for example electron-beam lithography. This does not preclude the future use of more advanced lithographic processes that have been proposed, for example X-ray lithography, to achieve sub-micron resolution.

Additionally, only the use of indium gallium arsenide (InGaAs) with indium phosphide (InP) has been discussed, but it is to be understood that other materials could be used in place of InGaAs as long as it is possible to lattice match the material with indium phosphide. Additionally, InP may be replaced by another material that exhibits the planar regrowth that InP does when deposited in the presence of $PCI_3$ (or another halogen compound, Harlow et al, op cit.). However, the use of InP is preferred as it is commonly used in the fabrication of optical and electro-optical components in telecommunications equipment and can emit light in the telecommunications transmission windows centred around 1.3 µm and 1.55 µm The size of the rods in the woodpile structure determines the properties, for example the wavelength(s) of the stop band of the photonic band gap material. Thus these properties are determined by the width of the mask details (which determines the 'width' of the rods) and the control of the depth of the material deposited (which determines the 'height' of the rods and using MOVPE techniques this can be controlled to give sub-micron resolution). For an InP woodpile band gap material made using the method of the present invention and having a rod cross-section of 1 µm×1 µm it is believed that the stop band wavelength will be in the region of 10 µm. To fabricate a band gap material having a stop band in the region of the telecommunications transmission wavelengths (centred around 1.3 µm and 1.55 µm) it is believed that a sub-micron rod dimension will be required.

Using the method of the present invention it is possible to fabricate rods having a substantially square cross-section or a rectangular cross-section and the relative magnitude of the height and the width of the rods can be varied to vary the property of the photonic band gap material (although as the dimensions of the rod are decreased, the wavelengths of the stop band of the photonic band gap material will be decreased). It will be clearly understood that the structure described above having rods with dimensions of 1 µm×1 µm is given solely as an example. It will also be understood that the ratio of rod size to the space separating adjacent rods (referred to as the mark-space ratio) is also given solely by way of example and may be varied to alter the properties of the structure.

Although the examples described above show that the layers of rods in the crystal are arranged at right-angles to the preceding layer, it is to be understood that this is merely one option and that any rotational offset from the preceding layer can be chosen, although this will have an effect on the properties of the crystal being fabricated. For example, if the offset angle is 60 degrees then the rods of the first, fourth, seventh and every subsequent third layer will be parallel (as will the rods of the second, fifth and eighth layers and the rods of the third, sixth and ninth layers, etc.).

Also, it is also possible to introduce a lateral offset into the structure of the crystal so that for layers in the same orientation the rods are not vertically aligned i.e. for a crystal with a 90 degree offset between subsequent layers, each layer is offset by 0.5 µm from the preceding parallel layer such that the first, third and fifth layers are all parallel to each other whilst the first and fifth layers are vertically aligned [as are the third and the seventh layers] (for an example of such a crystal structure see Lin et al, "A three-dimensional photonic crystal operating at infrared wavelengths", Nature, vol. 394, Jul. 16, 1998, pp 251–253).

Photonic band gap material and structures as described above may be incorporated into opto-electronic devices, in particular all-optical devices, as, for example, reflectors, mirrors, confinement structures, waveguides, etc.

What is claimed is:

1. A method of making a photonic band gap material, the method comprising:

(a) growing an epitaxial layer of a first semiconductor material onto a substrate;

(b) applying a mask to selected areas of the first semiconductor material and etching away the non-masked areas of the first semiconductor material to form a plurality of recesses;

(c) selectively growing an epitaxial layer of a second semiconductor material, while the mask applied in step (b) is still in place, to fill the plurality of recesses created by the etching of the first semiconductor material;

(d) removing the mask and subsequently growing a further epitaxial layer of the first semiconductor material over the first semiconductor material and the second semiconductor material;

(e) applying a mask to selected areas of the further epitaxial layer of the first semiconductor material and etching away the non-masked areas of the further epitaxial layer of the first semiconductor material to form a further plurality of recesses, said further plurality of recesses being rotationally displaced with respect to the plurality of recesses formed within the preceding layer of the first semiconductor material;

(f) selectively growing a epitaxial layer of the second semiconductor material, to fill the recesses created by the etching of the first semiconductor material; and (g) repeating steps (d), (e), and (f) as required to form a semiconductor product having a plurality of layers of interleaved regions of the first semiconductor material and the second semiconductor material, the regions in each of the layers being rotationally displaced with respect to the regions inn the adjacent layers for producing photonic band gap material.

2. A method of processing semiconductor materials according to claim 1, the method being further characterised by the etching of the semiconductor product to selectively remove substantially all of the first semiconductor material whilst leaving the second semiconductor material substantially unaffected.

3. A method of processing semiconductor materials according to claim 1, the method being further characterised by the etching of the semiconductor product to selectively remove substantially all of the second semiconductor material whilst leaving the first semiconductor material substantially unaffected.

4. A method of processing semiconductor materials according to claim 1, wherein adjacent layers of semiconductor materials are rotationally displaced by substantially 90°.

5. A method of processing semiconductor materials according to claim 1, wherein the first semiconductor material is indium gallium arsenide.

6. A method of processing semiconductor materials according to claim 1, wherein the second semiconductor material is indium phosphide.

7. A method of processing semiconductor materials according to claim 6, wherein the indium phosphide is selectively grown in the presence of a chloride compound.

8. A method of processing semiconductor materials according to claim 7, wherein the indium phosphide is selectively grown in the presence of phosphorus trichloride ($PCl_3$).

* * * * *